July 6, 1948.  F. G. SHROUT  2,444,681
CULINARY UTENSIL
Filed May 7, 1946
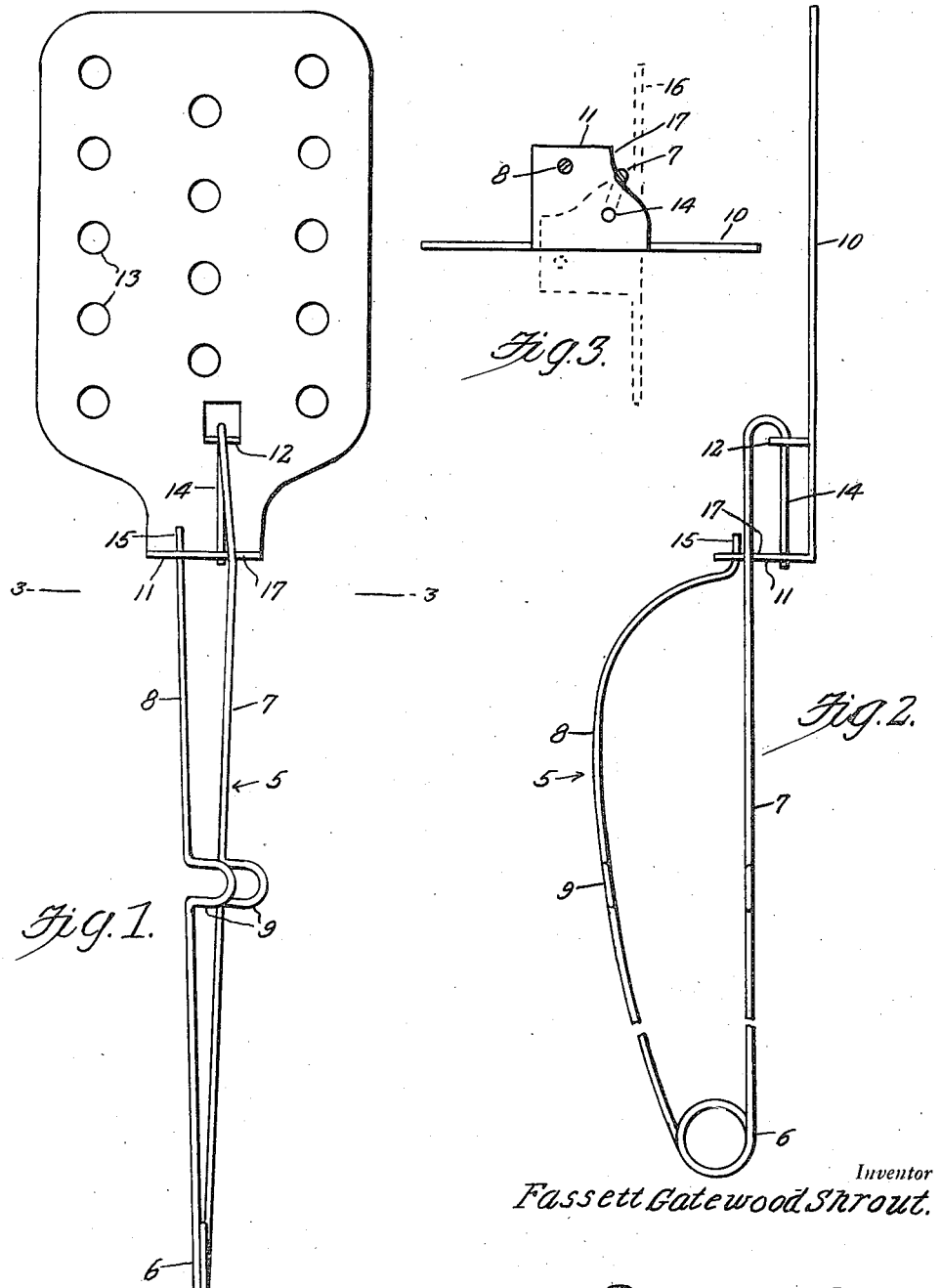
Inventor
*Fassett Gatewood Shrout.*
By *Clarence A. O'Brien and Harvey B. Jacobson*
Attorneys Patented July 6, 1948

2,444,681

UNITED STATES PATENT OFFICE 2,444,681

CULINARY UTENSIL

Fassett Gatewood Shrout, Harriman, Tenn.

Application May 7, 1946, Serial No. 667,934

6 Claims. (Cl. 294—8)

This invention relates to new and useful improvements and structural refinements in culinary utensils, more specifically, to a device of the character herein described, such as may be conveniently and effectively employed for turning over pancakes, and the like.

The principal object of the invention is to provide a utensil which is easily operated and with which the turning over operation may be accomplished with the minimum of skill and effort.

A further object of the invention is to provide a utensil which is simple in construction, pleasing in appearance, and which will not easily become damaged.

Although as aforesaid, the invention is primarily intended for use with pancakes, it will be apparent that the utility of the invention may be extended without modification to many other uses, wherever it is required to turn over a product or an article from one side to the other.

With the above more important objects in view, and such other objects as may become apparent as this specification proceeds, the invention consists essentially of the arrangement and construction of parts as illustrated in the accompanying drawings, in which—

Figure 1 is a top plan view of the invention.

Figure 2 is a side elevation thereof, and

Figure 3 is a cross sectional view taken in the plane of the line 3—3 in Figure 1.

Like characters of reference are used to designate like parts in the specification and throughout the several views.

Referring now to the accompanying drawings in detail, the invention embodies in its construction a one-piece wire-like rod designated generally by the reference character 5, the same being coiled medially of its length as at 6, to provide a pair of relatively adjacent, resilient arms 7 and 8.

The arms 7 and 8 thus constitute a handle, so to speak, and each arm is provided with an angulated portion medially of its length, forming the finger piece 9, hereinafter more fully described.

The pancake receiving platform 10 is configurated substantially as shown and one end portion of this platform is angulated to provide an upstanding bracket 11. A relatively smaller bracket 12 is notched out, so to speak, from the body portion of the platform 10, and the platform may be provided, if desired, with a plurality of the openings or perforations 13.

The free end of the arm 7 is doubled under itself, as it were, to provide the portion 14, this being rotatably journaled in suitable apertures formed in the brackets 11, 12. The free end 15 of the remaining arm (8) is pivotally connected to the bracket 11, as will be clearly apparent from the accompanying drawings.

It will be noted that the configuration of the arm 8 and of the portion 18 is such that the arms are effectively retained in connection with the platform 10, in other words, that the arms cannot slide outwardly from the apertures in which they are rotatably journaled.

When the invention is placed in use, it will be noted that by pressing the arms 7 and 8 together will produce rotation of the platform 10 about the portion 14, to a position indicated by the phantom lines 16. This rotation results from the pivoting action of the portion 14 in the brackets 11, 12, while the end portion 15 functions in a lever-like manner with respect to said pivot.

The extent of rotation of the platform 10 about the portion 14 is limited by the edge 17 of the bracket 11 contacting the adjacent arm 7, the contour of the edge 17 being such as to make this limiting function possible.

It will be noted that the finger pieces 9 add width, so to speak, to the arms 7 and 8, thus enabling the latter to be more easily pressed together.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

1. A culinary utensil of the class described, comprising in combination, a one-piece wire-like rod coiled medially of its length and providing a pair of relatively adjacent, resilient arms, said arms constituting an actuating handle, a substantially flat platform, an angulated portion at one end of said platform forming an upstanding bracket, a further bracket on said platform and spaced from said first mentioned bracket, the free end of one of said arms being doubled under itself and being rotatably journaled in said brackets, the free end of the remaining of said arms being pivotally connected to said first mentioned bracket, the pressing together of said arms causing the rotation of said platform about said doubled portion of said arm, and means for restricting the extent of said rotation.

2. The device as defined in claim 1, in which said arms are angulated medially of their length to provide a pair of finger pieces.

3. The device as defined in claim 1, in which said arm provided with said doubled portion is engageable with said first mentioned bracket to limit the extent of rotation of said platform.

4. The device as defined in claim 1, in which said platform is formed with a plurality of perforations.

5. In a utensil of the character described the combination of a lifting and turning blade having a vertical flange projecting from the rear end thereof and a vertical flange in front of the first mentioned flange, the first mentioned flange being provided with an opening which is offset with respect to the central axial line of the blade and with a second opening laterally spaced from the first opening and the second mentioned flange having an opening therethrough in substantial longitudinal alignment with the second opening in the first mentioned flange, and a handle comprising upper and lower spring wire arms connected by a substantially vertical coil, the upper arm having its forward end projecting through the first opening in the first mentioned flange and the lower arm extending forwardly beyond the second flange and being bent downwardly and rearwardly upon itself, the downwardly and rearwardly extending portion projecting through the opening in the second flange and through the second opening in the first mentioned flange, a portion of the first mentioned flange which is remote from the first opening therein being provided with a stop to be engaged by the portion of the second arm which projects over the portion which is mounted within the aligned apertures of the flange.

6. In the utensil set forth in claim 5 the portions of the spring arms intermediate of the coil and the blade being provided each with an outwardly bowed portion, the said portions being in substantial vertical alignment with each other whereby they may be grasped readily by the thumb and forefinger of an operator.

FASSETT GATEWOOD SHROUT.

REFERENCES CITED

The following references are of record in the file of this patent:

UNITED STATES PATENTS

| Number | Name | Date |
|--------|------|------|
| 606,205 | Good | June 28, 1898 |
| 1,828,187 | Holland | Oct. 20, 1931 |